(12) United States Patent
Villien (10) Patent No.: US 9,605,966 B2
(45) Date of Patent: Mar. 28, 2017

(54) METHOD FOR ESTIMATING A TRAJECTORY ORIENTATION FOLLOWED BY A MOVEMENT SENSOR CARRIER, CORRESPONDING DEVICE AND COMPUTER PROGRAM

(71) Applicants: COMMISSARIAT A L'ENERGIE ATOMIQUE ET AUX ENERGIES ALTERNATIVES, Paris (FR); MOVEA, Grenoble (FR)

(72) Inventor: Christophe Villien, Seyssinet-Pariset (FR)

(73) Assignees: Commissariat à l'énergie atomique et aux énergies alternatives, Paris (FR); Movea, Grenoble (FR)

( * ) Notice: Subject to any disclaimer, the term of this patent is extended or adjusted under 35 U.S.C. 154(b) by 0 days.

(21) Appl. No.: 14/785,465

(22) PCT Filed: Apr. 18, 2014

(86) PCT No.: PCT/FR2014/050950
§ 371 (c)(1),
(2) Date: Oct. 19, 2015

(87) PCT Pub. No.: WO2014/170618
PCT Pub. Date: Oct. 23, 2014

(65) Prior Publication Data
US 2016/0084656 A1 Mar. 24, 2016

(30) Foreign Application Priority Data
Apr. 19, 2013 (FR) .................................... 13 53616

(51) Int. Cl.
*G01C 21/12* (2006.01)
*G01C 21/14* (2006.01)
(Continued)

(52) U.S. Cl.
CPC ............. *G01C 21/12* (2013.01); *G01C 21/14* (2013.01); *G01P 13/00* (2013.01); *G01C 21/005* (2013.01); *G01C 21/06* (2013.01)

(58) Field of Classification Search
CPC .......... G01C 21/12; G01C 21/14; G01P 13/00
(Continued)

(56) References Cited

U.S. PATENT DOCUMENTS 6,813,582 B2 * 11/2004 Levi ....................... G01C 21/12
701/495
8,594,971 B2 * 11/2013 Keal .................... G01C 21/165
702/141
(Continued)

FOREIGN PATENT DOCUMENTS

WO 2013 022714 2/2013

OTHER PUBLICATIONS

International Search Report issued Sep. 4, 2014, in PCT/FR2014/050950 filed Apr. 18, 2014.
(Continued)

Primary Examiner — Tyler J Lee
(74) Attorney, Agent, or Firm — Oblon, McClelland, Maier & Neustadt, L.L.P.

(57) ABSTRACT

A method estimating orientation of a path followed by a carrier of a movement sensor includes: determining an orientation of the movement sensor with respect to the path; estimating an orientation of the movement sensor with respect to a fixed reference; estimating an orientation of the path with respect to the fixed reference by the determined orientation of the movement sensor and the estimated orientation of the movement sensor; detecting start and end of a phase of disorientation of the movement sensor with respect to the path; updating, after the detected end of the disorientation phase, determined orientation of the movement sensor with respect to the path by orientation of the
(Continued)

path with respect to the fixed reference as estimated at the detected start of the disorientation phase and orientation of the movement sensor with respect to the fixed reference as estimated after the detected end of the disorientation phase.

10 Claims, 2 Drawing Sheets

(51) Int. Cl.
   *G01P 13/00* (2006.01)
   *G01C 21/00* (2006.01)
   *G01C 21/06* (2006.01)
(58) Field of Classification Search
   USPC .................................................. 701/519, 518
   See application file for complete search history.

(56) References Cited

U.S. PATENT DOCUMENTS

| | | | | |
|---|---|---|---|---|
| 8,914,037 | B2* | 12/2014 | Czompo | G01C 21/165 342/202 |
| 2003/0018430 | A1* | 1/2003 | Ladetto | G01C 21/16 701/472 |
| 2009/0292495 | A1* | 11/2009 | Navarro, Jr. | G01C 19/42 702/92 |
| 2012/0072166 | A1* | 3/2012 | Keal | G01C 21/165 702/150 |
| 2012/0259578 | A1 | 10/2012 | Bevilacqua et al. | |
| 2012/0296603 | A1 | 11/2012 | Kulik et al. | |
| 2013/0040653 | A1* | 2/2013 | Czompo | G01C 21/165 455/456.1 |
| 2013/0046505 | A1* | 2/2013 | Brunner | G01C 21/165 702/141 |
| 2013/0158928 | A1* | 6/2013 | Hogdal | G01C 21/20 702/104 |
| 2014/0046586 | A1 | 2/2014 | Keal et al. | |

OTHER PUBLICATIONS

French Search Report Issued Jan. 7, 2014 in French Patent Application No. 1353616 filed Apr. 19, 2013.

* cited by examiner

METHOD FOR ESTIMATING A TRAJECTORY ORIENTATION FOLLOWED BY A MOVEMENT SENSOR CARRIER, CORRESPONDING DEVICE AND COMPUTER PROGRAM

BACKGROUND OF THE INVENTION

The present invention relates to a method for estimating a path orientation followed by a movement sensor carrier. It also relates to a corresponding device and computer program.

It applies to the technical field of detecting movements and in particular to the indoor location and following of a moving physical system carrying a movement sensor, for example the location inside a building of a person carrying a device in which such movement sensor is integrated. Among promising technologies, the approach by inertial measurement by means of a movement sensor appears to be the most appropriate for applications to the general public since it is now available with potential users in some cellphones and digital tablets.

The invention therefore applies more particularly to a method for estimating an orientation of a path followed by a carrier of a movement sensor comprising the following steps:
  determining an orientation of the movement sensor with respect to the path followed by the carrier,
  estimating an orientation of the movement sensor with respect to a fixed reference linked to the terrestrial reference frame by means of measurements supplied by the sensor, and
  estimating an orientation of the path followed by the carrier with respect to the fixed reference by means of the determined orientation of the movement sensor with respect to the path and the estimated orientation of the movement sensor with respect to the fixed reference.

Although open to improvement, all the means necessary for implementing the aforementioned steps, or even the complete following of a path from the determination of its orientation, are well known and technically mastered (measurement of heading, counting of steps, etc.) with the exception of only one: the one making it possible to reliably know the orientation of the movement sensor with respect to the path followed by the physical system being observed, that is to say the carrier of the sensor. This problem of determining the orientation of the movement sensor with respect to the path is difficult to solve, the solutions being rare and unsatisfactory.

Generally, the sensor is then attached to the carrier so that constraining assumptions are made on its relative orientation with respect to the carrier and therefore with respect to the path followed by the carrier. However, this solution is not satisfactory for applications in which the sensor is integrated in a portable device, cellphone or digital tablet, intended to be simply carried without any particular attachment.

For the purpose of being free from these assumptions and constraints, the patent application published under the number US 2012/0072166 A1 discloses a method for estimating at each instant the relative orientation of the sensor with respect to the path. However, this method imposes other no less constraining assumptions. In particular, the method disclosed in this document consists of vertically projecting a reference related to the movement sensor onto the fixed reference related to the terrestrial reference frame. As detailed on pages 2 and 3 of this document, the horizontal angle between this projected reference and the one related to the path is estimated by angular optimization of a horizontal acceleration measured by the sensor.

The assumption imposed by this document is therefore that the horizontal acceleration measured by the movement sensor is maximal in the horizontal direction of the path followed by the physical system being observed. Apart from the fact that this assumption is itself constraining, it makes the taught method not very robust since it is not actually always verified. This is because, in the case of an application of following a person who is moving by walking, though it is true that his feet follow an acceleration generally oriented in the direction of the path, it is not necessarily the same with the other parts of the body of the person being observed. In particular, the general movement of the person, and therefore of a major part of his body, may take place at constant speed, that is to say at zero acceleration, so that the horizontal acceleration measured by the sensor does not reveal the principal movement. Furthermore, with the exception of the feet, the other parts of the body of the person may be affected by parasitic movements not related to the orientation of the path and may give rise to relatively great accelerations: this is for example the case with rocking movements of the arms.

In addition, still in the case of an application of following a person who is moving by walking, the method used in the document US 2012/0072166 A1 does not make it possible to estimate the direction of movement of the person. To do this, other processing operations on the signals measured are used. Finally, another related drawback is the need to record a large number of measurements prior to the computation, a correct estimation of the path followed by the person being obtained only as from around ten steps. This estimation is therefore not carried out in real time.

It may thus be desired to provide a method for estimating a path orientation that at least partly dispenses with the aforementioned problems and constraints.

BRIEF SUMMARY OF THE INVENTION

A method for estimating an orientation of a path followed by a carrier of a movement sensor is therefore proposed, comprising the following steps:
  determining an orientation of the movement sensor with respect to the path followed by the carrier,
  estimating an orientation of the movement sensor with respect to a fixed reference related to the terrestrial reference frame by means of measurements supplied by the sensor,
  estimating an orientation of the path followed by the carrier with respect to the fixed reference by means of the determined orientation of the movement sensor with respect to the path and the estimated orientation of the movement sensor with respect to the fixed reference,
further comprising the following steps:
  detecting a start and end of a phase of disorientation of the movement sensor with respect to the path, and
  updating, after the detected end of the disorientation phase, the determined orientation of the movement sensor with respect to the path by means of the orientation of the path with respect to the fixed reference as estimated at the detected start of the disorientation phase and the orientation of the movement sensor with respect to the fixed reference as estimated after the detected end of the disorientation phase.

Thus, from the moment when an initial value of the movement sensor with respect to the path is available, knowing that it is technically simple to detect phases of disorientation of the movement sensor, it advantageous to simply update the orientation of the sensor with respect to the path in a relative fashion according to its last known value, rather than proceeding with a complex and uncertain absolute estimation, whenever a disorientation is detected. This is because the updating principle proposed by the invention simply supposes that the path followed by the observed physical system carrying the movement sensor has a constant orientation during the phase of disorientation of the sensor, which constitutes a clever, realistic and unconstraining assumption.

Optionally, a prior value of the orientation of the movement sensor with respect to the path is predetermined by recording a value entered by a user or known by default.

Optionally also:
a plurality of prior values of the orientation of the movement sensor with respect to the path are predetermined by recording values entered by a user or known by default, each prior value being associated with a possible predetermined placement of the sensor, and
one of these prior values is selected by means of measurements supplied by the sensor and characteristics of the various possible predetermined placements of the sensor.

Optionally also, a prior value of the orientation of the movement sensor with respect to the path is determined by estimation by means of a known prior value of the orientation of the path with respect to the fixed reference and the orientation of the movement sensor with respect to the fixed reference as estimated at an initial instant.

Optionally also, a method for estimating a path orientation according to the invention may further comprise the following steps:
estimating a speed of the carrier by means of measurements supplied by the sensor, and
reconstructing the path followed by the carrier by means of the estimated speed of the carrier and the estimated orientation of the path followed by the carrier with respect to the fixed reference.

Optionally also, the movement sensor comprising an accelerometer with three measurement axes, a magnetometer with three measurement axes and a gyrometer with three measurement axes:
the orientation of the movement sensor with respect to the fixed reference is estimated by means of the measurements supplied by the accelerometer, the magnetometer and the gyrometer, and
the speed of the carrier is estimated by means of the measurements supplied by the accelerometer.

Optionally also, the orientation of the movement sensor with respect to the fixed reference as estimated after the detected end of the disorientation phase is an averaged or filtered value so as to reduce an effect of parasitic fluctuations of the movement of the carrier.

A computer program is also proposed, downloadable from a communication network and/or recorded on a medium that can be read by a computer and/or executed by a processor, comprising instructions for executing the steps of an orientation estimation method according to the invention, when said program is executed on a computer.

A device for estimating an orientation of a path followed by a carrier is also proposed, comprising:
a movement sensor intended to be carried by the carrier,
means for storing an orientation value of the movement sensor with respect to the path followed by the carrier, and
a computer connected to the movement sensor and to the storage means, programmed to:
estimate an orientation of the movement sensor with respect to a fixed reference related to the terrestrial reference frame by means of measurements supplied by the carrier, and
estimating an orientation of the path followed by the carrier with respect to the fixed reference by means of the stored orientation value of the movement sensor with respect to the path and the estimated orientation of the movement sensor with respect to the fixed reference,
this device further comprising a detector for a start and end of a phase of disorientation of the movement sensor with respect to the path, and the computer further being programmed to update, after the detected end of the disorientation phase, the stored orientation value of the movement sensor with respect to the path by means of the orientation of the path with respect to the fixed reference as estimated at the detected start of the phase of disorientation and the orientation of the movement sensor with respect to the fixed reference as estimated after the detected end of the disorientation phase.

Optionally, a device for estimating a path orientation according to the invention may comprise a digital tablet or a cellphone, the movement sensor, the storage means and the computer being integrated in this digital tablet or cellphone.

BRIEF DESCRIPTION OF THE SEVERAL VIEWS OF THE DRAWINGS

The invention will be better understood by means of the following description given solely by way of example and made with reference to the accompanying drawings, in which.

DETAILED DESCRIPTION OF THE INVENTION

Figure 1:
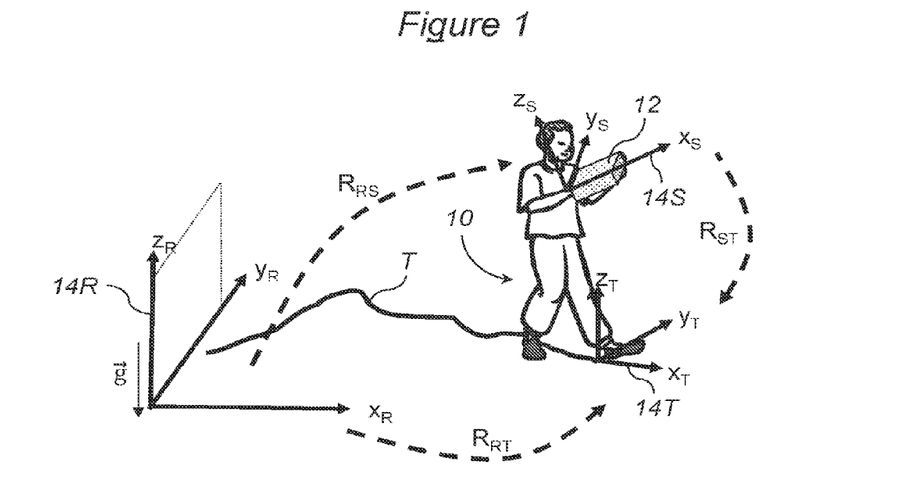
FIG. 1 illustrates a scene where a device for estimating an orientation of a path followed by a physical system carrying a movement sensor, in this case a person, is used.

The scene illustrated in FIG. 1 shows a physical system 10, for example a person, moving on a path T and carrying a device 12 such as a digital tablet. The digital tablet 12 is provided with a device for estimating the orientation of the path T followed by the person 10, or even more precisely a device for detecting and following this path T. This device, provided with a movement sensor, will be detailed with reference to FIG. 3, In this scene, it is important to identify some references. First of all, a first fixed reference 14R, related to the terrestrial reference frame, has three orthogonal axes $x_R$, $y_R$ and $z_R$. The axis $z_R$ is vertical and directed upwards, that is to say in the direction opposite to the vector $\vec{g}$ representing gravitational acceleration. The other two horizontal axes $x_R$ and $y_R$ are for example oriented respectively in the east and north directions. In general terms, this fixed reference 14R is related to the geophysical quantities able to be measured by the movement sensor (gravitational acceleration and magnetic north for example). The coordinates of the vector $\vec{g}$ are thus expressed in the form (0; 0; −9.81 m·s$^{-2}$) in the fixed reference 14R. A second movable reference 14S related to the digital tablet 12 has three orthogonal axes $x_s$, $y_s$ and $z_s$ defined with respect to the orientation of the movement sensor in the tablet. Finally, a third movable reference 14T, related to the path, has three orthogonal axes $x_T$, $y_T$ and $z_T$ defied as follows: the axis $x_T$ is tangent to the current direction of the path T followed by the person 10 and is in the horizontal plane ($x_R$; $y_R$); the axis $y_T$ is orthogonal to the axis $x_T$ in the horizontal plane ($x_R$; $y_R$) and directed towards the left looking in the direction of movement; the axis $z_T$ is, like the axis $z_R$, vertical and directed upwards.

The main objective of a method according to the invention being to estimate at each instant the orientation of the path T followed by the person 10 carrying the digital tablet 12, expressing this orientation in the fixed reference 14R, this amounts to determining the reference change matrix $R_{RT}$ for changing from coordinates expressed in the movable reference 14T into coordinates expressed in the fixed reference 14R. This matrix $R_{RT}$ can easily be deduced from two other reference change matrices: the reference change matrix $R_{RS}$ for changing from coordinates expressed in the movable reference 14S into coordinates expressed in the fixed reference 14R and the reference change matrix $R_{ST}$ for changing from coordinates expressed in the movable reference 14T into coordinates expressed in the movable reference 14S.

Knowing the matrix $R_{RT}$, it is then possible to easily determine the direction and axis of the movement of the person 10, these being defined by the orientation of the path T.

More precisely, the matrix $R_{RT}$ can be obtained by means of the following matrix product:

$$R_{RT} = R_{RS} \cdot R_{ST}.$$

Obtaining the matrix $R_{RS}$ is simple and well known. This amounts to estimating the orientation of the digital tablet 12 (that is to say the orientation of the movable reference 14S related to its movement sensor) with respect to the fixed reference 14R. This is done by means of measurements supplied by the movement sensor.

For example, when the movement sensor comprises a magnetometer with three measurement axes and an accelerometer with three measurement axes, the accelerometer measures, in its axis system which is that of the movable reference 14S, the acceleration $\vec{g}$ the coordinates of which (0; 0; −9.81 m·s$^{-2}$) are moreover known in the fixed reference 14R. The magnetometer measures, in its axis system, which is also that of the movable reference 14S, the terrestrial magnetic field the coordinates of which (0; 20.767 μT; −43.198 μT) are moreover known in the fixed reference 14R. The reference change matrix $R_{RS}$ can therefore be estimated by applying the following three formulae:

$$R_{RS}(:,1) = \frac{\langle Z_{ACC} \rangle \times \langle Z_{MAG} \rangle}{\|\langle Z_{ACC} \rangle \times \langle Z_{MAG} \rangle\|}, R_{RS}(:,3) = -\frac{\langle Z_{ACC} \rangle}{\|\langle Z_{ACC} \rangle\|} \text{ and}$$

$$R_{RS}(:,2) = R_{RS}(:,3) \times R_{RS}(:,1).$$

In these formulae, the expression $R_{RS}(:,i)$ represents the $i^{th}$ column of the matrix $R_{RS}$, $Z_{ACC}$ and $Z_{MAG}$ are column vectors representing respectively the vector measurements of the accelerometer and magnetometer, the operator $\langle \rangle$ symbolizes the fact that these measurements are filtered or averaged in order to reduce the influence of noise, the operator $\|\ \|$ symbolizes the Euclidean norm and the operator x symbolizes the vector product. The first of these formulae expresses the fact that the opposite of the normed measurement of the accelerometer is the expression of $z_R$ in the movable reference 14S. The second of these formulae expresses the fact that $y_R$ is by definition orthogonal to gravity and to the terrestrial magnetic field, which is horizontal, that is to say $y_R$ is the normed vector product of these two quantities. Finally, the third of these formulae expresses the fact that $x_R$ is by definition the vector product of $y_R$ and $z_R$.

This configuration of the movement sensor, in which it comprises a magnetometer and an accelerometer, is the minimum configuration for completely determining the matrix $R_{RS}$ in the example in question, but it has the drawback of being affected by noise since the measurements that it uses are generally disturbed. In particular the accelerometer is disturbed by inherent accelerations and the magnetometer is affected by noise through the disturbances of the terrestrial magnetic field.

Other configurations, for example wherein the movement sensor comprises a gyrometer in addition to the magnetometer and the accelerometer, make it possible to improve the performances of the estimation of the matrix $R_{RS}$ by merging the measurements by means of algorithms derived from the Kalman filter.

More generally, and without adding any particular teaching for implementing the invention, other well-known configurations, not necessarily including a magnetometer and accelerometer, may be envisaged by a person skilled in the art for the entirely conventional computing of the matrix $R_{RS}$.

Obtaining the matrix $R_{ST}$ is complex and remains a problem that is poorly solved in the prior art, as stated previously. This consists, in the example illustrated by FIG. 1, of estimating an orientation of the movement sensor integrated in the digital tablet 12 with respect to the path T followed by the person 10.

Figure 2:
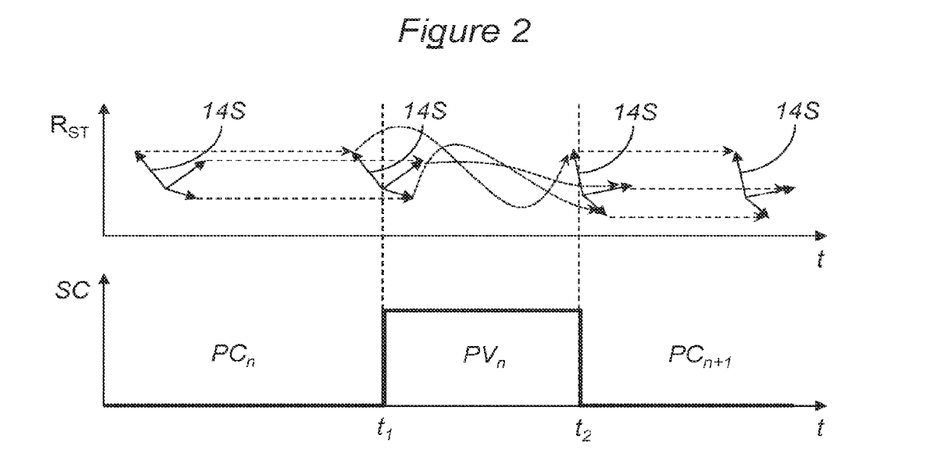
FIG. 2 illustrates an example of a sequence of movement of the person in FIG. 1, having a phase of disorientation of the device that he is using in order to estimate the orientation of his path.

Rather than establishing hypotheses that have many consequences and are not very robust as in the document US 2012/0072166 A1, it is simply considered, in the present invention and as illustrated by FIG. 2, that:

a sequence of walking of the person 10 in FIG. 1, or more generally a sequence of movement of an observable physical system carrying a movement sensor, can be subdivided into a succession of phases where the orientation of the movement sensor is constant with respect to the person 10, and therefore with respect to the path T since it can reasonably be considered that the orientation of the person 10 is very greatly correlated with his path T, and phases where the orientation of the movement sensor with respect to the path T is variable, the phases during which the orientation of the movement sensor with respect to the path T is variable are limited in time and correspond to moments where the path T keeps the same orientation (i.e. no change in heading while the person 10 modifies his way of carrying the digital tablet 12).

Furthermore, it can be considered that an initial orientation of the movement sensor with respect to the person 10 is either known a priori, or can be determined: it is solely a problem of initialization.

Consequently, and in the example illustrated in FIG. 2, during a phase $PC_n$ of constant orientation of the tablet 12 and of its movement sensor with respect to the person 10, it can be considered that the movable reference 14S remains of constant orientation with respect to the movable reference 14T until a time $t_1$, this constant orientation denoted $R_{ST}(n)$ being represented by the relationship:

$$\forall t \leq t_1, R_{ST}(t) = R_{ST}(n).$$

During a following phase $PV_n$ of disorientation of the tablet 12 and of its movement sensor with respect to the person 10, therefore with respect to his path T, between time $t_1$ and a time $t_2$, $R_{ST}(t)$ is variable and therefore a priori unknown, but the heading of the path T remains constant. This is represented by the relationship:

$$\forall t, t_1 \leq t \leq t_2 \Rightarrow R_{RT}(t) = R_{RT}(t_1) = R_{RT}(t_2).$$

Finally, during a following phase $PC_{n+1}$ of once again constant orientation of the tablet 12 and of its movement sensor with respect to the person 10, it can be considered that the movable reference 14S once again remains of constant orientation with respect to the movable reference 14T from time $t_2$ until a further disorientation of the tablet 12 (not illustrated), this constant orientation denoted $R_{ST}(n+1)$ being represented by the relationship:

$$\forall t \geq t_2, R_{ST}(t) = R_{ST}(t_2) = R_{ST}(n+1).$$

An instruction signal SC may accompany the succession of constant orientation phases and disorientation phases, taking for example a low value (for example "0") in a constant orientation phase and a high value (for example "1") in a disorientation phase.

Changes from the lower value to the high value and vice versa of the instruction signal SC may, in a particularly simple embodiment of the invention, be controlled manually by the carrier 10 of the digital tablet 12 himself when he changes the position of the latter. In a variant, these transition times $t_1$ and $t_2$ may be detected automatically, for example by detecting a variation, above a certain threshold, in the norm of the measurements supplied by the accelerometer of the movement sensor or of the orientation of the movement sensor with respect to the fixed reference 14R.

Figure 3:
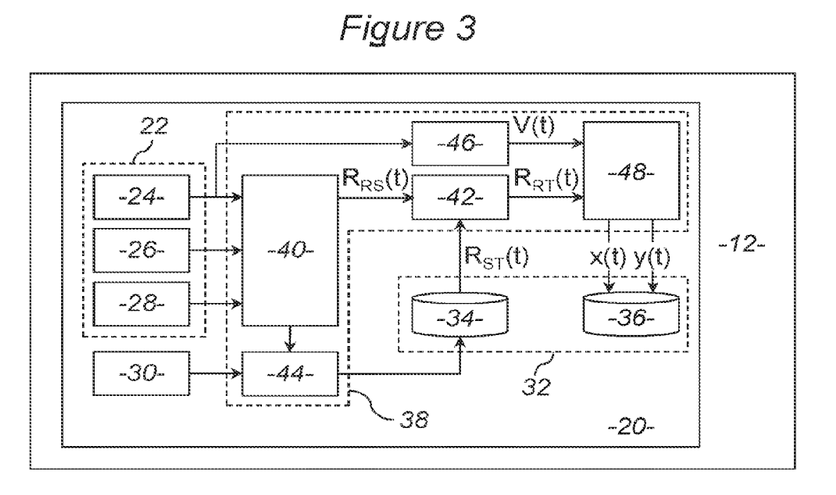
FIG. 3 shows schematically the general structure of a device for estimating a path orientation, for example that of FIG. 1, according to one embodiment of the invention.

As illustrated schematically in FIG. 3, the digital tablet 12 is provided with a device 20 for detecting and following the path T followed by the person 10.

This detection and following device 20 comprises a movement sensor 22. Advantageously, the movement sensor 22 comprises an accelerometer 24 with three measurement axes, a magnetometer 26 with three measurement axes and a gyrometer 28 with three measurement axes.

The detection and following device 20 further comprises a detector 30 for the starts and ends of disorientation phases of the digital tablet 12, and therefore of the movement sensor 22, with respect to the path T. This detector 30 is designed so as to supply, as indicated previously, the instruction signal SC. It may therefore optionally be connected to the movement sensor 22 for analyzing at least some of its measurements so as automatically to supply the instruction signal SC.

The detection and following device 20 further comprises means 32 for storing:

an orientation value of the movement sensor 22 with respect to the path T, this value being for example stored in a memory area 34 of the means 32 in the form of the previously mentioned reference change matrix $R_{ST}$, and coordinates (x, y) of the path T expressed in the fixed reference 14R, these coordinates being for example stored in a memory area 36 of the means 32.

The detection and following device 20 further comprises a computer 38, connected to the movement sensor 22 and to the storage means 32. This computer 38 may for example be implemented in a data-processing module comprising a processor associated with one or more memories for storing data files and computer programs. It may then itself be considered to be formed by a processor associated with a memory for storing instructions that it executes in the form of computer programs.

Figure 4:
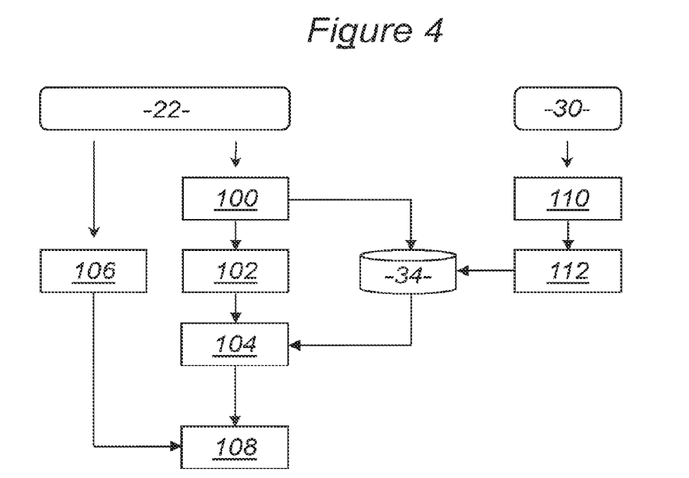
FIG. 4 illustrates the successive steps of a method for estimating an orientation of a path followed by a movement sensor carrier, according to one embodiment of the invention.

The computer 38 as illustrated in FIG. 4 thus functionally comprises five computer programs, or five functions of the same computer program, bearing the references 40, 42, 44, 46 and 48. It should be noted indeed that the computer programs 40, 42, 44, 46 and 48 are presented as distinct, but this distinction is purely functional. They could just as well be grouped together in all possible combinations in one or more software packages. Their functions could also be at least partly microprogrammed or microwired in dedicated integrated circuits. Thus, in a variant, the computer module implementing the computer 38 could be replaced by an electronic device composed solely of digital circuits (without a computer program) for performing the same actions.

A first computer program 40 of the computer 38 comprises program instructions for executing an estimation, at each instant, of an orientation of the digital tablet 12 with respect to the fixed reference 14R using the measurements supplied by the movement sensor 22. It makes it possible, according to the principle detailed above using an extended Kalman filter, to supply a value $R_{RS}(t)$ at each time t of the reference change matrix $R_{RS}$.

A second computer program 42 of the computer 38 comprises program instructions for executing an estimation, at each instant, of an orientation of the path T with respect to the fixed reference 14R using, firstly, the value $R_{ST}$, stored in memory 34, of the orientation of the movement sensor 22 with respect to the path T, and secondly of the orientation, estimated by the first computer program 40, of the digital tablet 12 (i.e. of the movement sensor 22) with respect to the fixed reference 14R. In concrete terms, it makes it possible, according to the equation $R_{RT} = R_{RS} \cdot R_{ST}$, to supply a value $R_{RT}(t)$ at each time t of the reference change matrix $R_{RT}$ by calculating the product of the value $R_{RS}(t)$ supplied at the time t by the execution of the first program 40 and a value $R_{ST}(t)$ extracted at the same time t from the reference change matrix $R_{ST}$. The value $R_{ST}(t)$ is quite simply the current value of the matrix $R_{ST}$ stored in memory 34.

The initialization problem consisting of previously determining a value of the orientation of the movement sensor 22 with respect to the path T and recording this value in the matrix form $R_{ST}$ in the memory 34 may be solved in various ways.

According to a first embodiment, a prior value of the orientation of the movement sensor 22 with respect to the path T is considered to be known and directly recorded, in the matrix form $R_{ST}$, in the memory 34. This recording may be done by default or be done by an entry by the person 10 on the touch interface of the digital tablet 12. This first particularly simple embodiment is entirely realistic. This is because the use of a navigation application on a cellphone or a digital tablet such as the tablet 12, the application referred to in the context of the invention, means that the person 10 performs actions with the device held in his hand, with the screen facing him. For example, the person 10 gives details of his destination in the case of an aid to navigation, or quite simply launches his application. At this time, the orientation of the movement sensor 22 with respect to the person 10 and therefore to the path T envisaged is known since the movement sensor is held in the hand, the screen of the device facing the person 10. In particular, the references 14S and 14T may be considered to be aligned so that the matrix $R_{ST}$ can be initialized to the identity matrix.

According to a second embodiment, several prior values of the orientation of the movement sensor 22 with respect to the path T are considered to be possible and directly recorded, in the aforementioned matrix form, in the memory 34. These recordings may be made by default or be done by entries by the person 10 on the touch interface of the digital tablet 12. In this case, each prior value is associated with a possible predetermined placement of the movement sensor 22, and therefore of the digital tablet 12, with respect to the path T. In a phase of initialization of the detection and following device 20 of the digital tablet 12, one of these prior values, recorded in the matrix form $R_{ST}$, may be selected by means of at least some of the measurements supplied by the movement sensor 22, in particular those that are characteristic of the various possible predetermined placements of the digital tablet 12 with respect to the path T. Provision may be made for identifying the initialization phase by a specific value (for example "2") of the instruction signal SC supplied by the detector 30.

According to a third embodiment, no prior value of the orientation of the movement sensor 22 with respect to the path T is known, but a prior value of the orientation of the path T with respect to the fixed reference 14R is considered to be known. Thus, at an initial time $t_0$ of an initialization phase of the detection and following device 20 of the digital tablet 12, the value $R_{RS}(t_0)$ of the matrix $R_{RS}$ supplied by the first computer program 40 may be used in combination with the prior value $R_{RT}(t_0)$ of the known matrix $R_{RT}$ in order to supply, in accordance with the equation $R_{RT} = R_{RS} \cdot R_{ST}$, a prior value $R_{ST}$ of the orientation of the movement sensor 22 with respect to the path T in accordance with the following computation:

$$R_{ST} = R_{ST}(t_0) = [R_{RS}(t_0)]^{-1} \cdot R_{RT}(t_0).$$

It should be noted that, the matrix $R_{RS}$ being a reference change matrix, that is to say a rotation matrix, its inverse is also its transpose, which simplifies the computations. It should also be noted that, as in the second embodiment, provision may be made for identifying the initialization phase by a specific value of the instruction signal SC.

In the third embodiment, the initialization may also be performed with a location system of the GPS or radio type, using two successive positionings.

Finally, it should be noted that, even if the matrix $R_{ST}$ is not at all known on initialization, or the heading of the path with respect to the fixed references are not at all known on initialization, it is possible to take an arbitrary value thereof. In this case, the invention does however have an advantage since despite everything it provides a coherent path, in an unknown absolute heading reference. This already represents highly advantageous information, since the unknown on the heading can be solved by introducing for example other modalities for measuring absolute position, even if these are imprecise, such as GPS or radio locations.

A third computer program 44 of the computer 38 comprises program instructions for executing an update, after the detected end of each disorientation phase $PV_n$, of the stored value, in the matrix form $R_{ST}$ in the memory 34, of orientation of the movement sensor 22 with respect to the path T.

This third computer program 44 functions as follows. At the detected time $t_1$ of the start of the disorientation phase $PV_n$, identified by the change of the instruction signal SC from "0" to "1", the value $R_{RT}(t_1)$ supplied by the second computer program 42, characteristic of the orientation of the path T with respect to the fixed reference 14R at this time $t_1$, is stored in memory. At the detected time $t_2$ of the end of the disorientation phase $PV_n$, identified by the change of the instruction signal SC from "1" to "0", the value $R_{RS}(t_2)$ supplied by the first computer program 40, characteristic of the orientation of the movement sensor 22 with respect to the fixed reference 14R at this time $t_2$, is used in combination with the value $R_{RT}(t_1)$ stored in memory in order to supply an update of $R_{ST}$ in accordance with the following computation:

$$R_{ST} = R_{ST}(t_2) = [R_{RS}(t_2)]^{-1} \cdot R_{RT}(t_2) = [R_{RS}(t_2)]^{-1} \cdot R_{RT}(t_1).$$

It is clear from the above equation that it is assumed that the value of $R_{RT}$ is constant between times $t_1$ and $t_2$ since the value $R_{RT}(t_2)$, which is unknown, is replaced by $R_{RT}(t_1)$. It should moreover be noted that this computation is very close to that made in the third embodiment of the initialization phase, so that it is very simple to adapt the third computer program 44 so that it proceeds with the calculation of the third embodiment of the initialization phase when the instruction signal SC takes its specific value "2".

A fourth computer program 46 of the computer 38 comprises program instructions for executing an estimation of the speed of movement of the person 10 along his path T using at least some of the measurements supplied by the movement sensor 22. More precisely, it is the measurements supplied by the accelerometer 24 that are used by this fourth computer program 46 in a manner known per se. In concrete terms, from the measurements of the accelerometer 24, counting the steps of the person 10 and estimating their length in order to deduce therefrom a value V(t) of the speed of movement at each instant is possible and known.

A fifth computer program 48 of the computer 38 comprises program instructions for executing a complete reconstruction of the path T followed by the person 10 by means of the speed V(t), estimated at each time t by the fourth computer program 46, and from the orientation $R_{RT}(t)$ of the path T with respect to the fixed reference 14R, estimated at each time t by the second computer program 42. This reconstruction may also use related means of evaluating the distance travelled by the person 10 as a function of time, such as for example a pedometer. The reconstruction is geometric and known per se. It makes it possible to provide, at each time t, the coordinates x(t) and y(t) of the path T expressed in the fixed reference 14R, these then being able to be recorded in the memory 36.

The movement sensor 22, the disorientation phase detector 30, the programs 40, 42, 44 of the computer 38 and the memory area 34 form by themselves alone a device for estimating an orientation of the path T. Supplemented by the programs 46, 48 and the memory area 36, they form more precisely the complete detection and following device 20.

According to a first variant embodiment of what was described above, the effect of the parasitic fluctuations of the movement of the person 10 can be reduced by smoothing, by proceeding with an average calculation or a filtering of the measurements supplied by the movement sensor 22 so as to use an averaged form of the reference change matrix $R_{RS}$ rather than its instantaneous value, in particular for estimating the value $R_{RS}(t_2)$ supplied by the first computer program 40 when the third computer program 44 is executed. It should be noted that the computation of an averaged form of the matrix $R_{RS}$ is not a simple problem since the usual techniques of computing averages or filtering are not necessarily valid with regard to rotation matrices. For example, an arithmetic mean of several rotation matrices is not a rotation matrix.

Thus, according to a first possible embodiment of this first variant, the smoothing is carried out prior to the computation, by the first computer program 40 and at a time t, of the value $R_{RS}(t)$ of the reference change matrix $R_{RS}$:

- by directly filtering or averaging the measurement signals supplied by the movement sensor 22 in a predetermined time window, for example a sliding window redefined at each time t, and
- by adjusting the parameters used for computing the value $R_{RS}(t)$ of the reference change matrix $R_{RS}$, in particular the covariance parameters of the Kalman filter used.

This first embodiment does indeed make it possible to eliminate the parasitic fluctuations but has the drawback of no longer supplying an instantaneous value of the matrix $R_{RS}$, whereas the latter may however be useful for other functions of the device 20 or more generally of the digital tablet 12.

According to a second possible embodiment of the first variant, the smoothing is carried out subsequently to the computing, by the first computer program 40 and at a time t, of the value $R_{RS}(t)$ of the reference change matrix $R_{RS}$.

This can be done by computing an exact mean rotation of several successive values of $R_{RS}(t)$ in a predetermined time window, in accordance with known techniques of rotation matrix mean calculations. These known techniques are unfortunately generally complex.

This can also be done more simply, by passing temporarily through a quaternion formalism, in the following manner:

- the successive values of $R_{RS}(t)$ to be averaged or filtered are transformed into successive quaternions in accordance with a well-known equivalence relationship between matrices and quaternions,
- an arithmetic mean or a simple filtering is carried out on the successive quaternions, which is a simple and well known operation because of the vectorial writing of quaternions,
- a normalization of the averaged or filtered quaternion obtained is executed (i.e. division of each coefficient of the averaged or filtered quaternion by the Euclidean norm of the quaternion for example), and
- the averaged or filtered and normalized quaternion is transformed into a corresponding averaged or filtered rotation matrix in accordance with the aforementioned equivalence relationship.

This is because it is the normalization of the averaged or filtered quaternion that ensures that the matrix finally obtained by inverse transformation of this quaternion is indeed a rotation matrix since it suffices to make the quaternion unitary in order to ensure that it does indeed correspond to a rotation.

According to a second variant embodiment of what was described above, the second computer program 42 is adapted to impose a constraint on the computation of the value $R_{RT}(t)$ at each time t of the reference change matrix $R_{RT}$. This is because, as indicated previously, if it is considered that the path T is planar in the fixed reference 14R, the vertical axis $z_T$ of the movable reference 14T relating to the path T must be aligned on the vertical axis $z_R$ of the fixed reference 14R and the axes $x_T$, $y_T$ must be in the plane ($x_R$, $y_R$). However, the simple product of the values $R_{RS}(t)$ and $R_{ST}(t)$ does not make it possible to ensure this.

According to this second variant, $R^*_{RT}=R_{RS} \cdot R_{ST}$ is denoted and the correction matrix such that $R_{RT}=R^*_{RT} \cdot R_{ST1}$ is denoted $R_{ST1}$. This correction matrix must be defined so that the matrix $R_{RT}$ at each instant takes the following form:

$$R_{RT} = \begin{bmatrix} \cos\theta & -\sin\theta & 0 \\ \sin\theta & \cos\theta & 0 \\ 0 & 0 & 1 \end{bmatrix},$$

where the angle θ represents the heading of the path T at each instant as expressed with respect to the horizontal axes $x_R$, $y_R$ of the fixed reference 14R. This is because the three columns of the matrix $R_{RT}$ represent respectively the three expressions of the unitary vectors of the axes $x_T$, $y_T$ and $z_T$ in the fixed reference 14R.

According to a possible embodiment of the second variant, the correction matrix $R_{ST1}$ is defined as the product of two rotation matrices $R_X$ and $R_Y$: $R_{ST1}=R_X \cdot R_Y$. By denoting the three orthogonal axes defined by the three columns of the matrix $R^*_{RT}$ as $x^*_T$, $y^*_T$ and $z^*_T$, the first of these two matrices $R_X$ exerts a rotation of angle α about the axis $x^*_T$ transferring the axis $y_T$ into the plane ($x_R$, $y_R$). The three orthogonal axes $x^*_T$, $y^*_T$ and $z^*_T$ then become $x^*_T$, $y^{*'}_T$ et $z^{*'}_T$. The second of these two matrices $R_Y$ exerts a rotation of angle β about the axis $y^{*'}_T$ transferring the axis $x_T$ into the plane ($x_R$, $y_R$). The three orthogonal axes $x^*_T$, $y^{*'}_T$ and $z^{*'}_T$ then become the axes $X_T$, $Y_T$ et $z_T$ of the matrix $R_{RT}$.

It is easily shown that the expression of the matrix $R_X$ is given by:

$$R_X = \begin{bmatrix} 1 & 0 & 0 \\ 0 & \cos\alpha & -\sin\alpha \\ 0 & \sin\alpha & \cos\alpha \end{bmatrix},$$

where $= \tan^{-1}\left(\dfrac{R^*_{RT}(3,2)}{R^*_{RT}(3,3)}\right)$.

$R^*_{RT}(3,2)$ and $R^*_{RT}(3,3)$ being the coefficients of the 3$^{rd}$ row, 2$^{nd}$ and 3$^{rd}$ columns of the matrix $R^*_{RT}$ obtained by the product $R^*_{RT}=R_{RS} \cdot R_{ST}$.

It is likewise shown easily that the expression of the matrix $R_Y$ is given by:

$$R_Y = \begin{bmatrix} \cos\beta & 0 & \sin\beta \\ 0 & 1 & 0 \\ -\sin\beta & 0 & \cos\beta \end{bmatrix},$$

where $= \tan^{-1}\left(\dfrac{R''_{RT}(3,1)}{R''_{RT}(3,3)}\right)$.

$R^{*\prime}_{RT}(3,1)$ and $R^{*\prime}_{RT}(3,3)$ being the coefficients of the 3$^{rd}$ row, 1$^{st}$ and 3$^{rd}$ columns of the matrix $R^{*\prime}_{RT}$ obtained by the product $R^{*\prime}_{RT}=R^{*}_{RT}\cdot R_X$.

In accordance with the above embodiment of the second variant, the second computer program 42 is therefore suitable for calculating, at each time t, the value $R_{RT}(t)$ of the matrix $R_{RT}$ by means of the following successive products:

$$R_{RT}(t)=R_{RS}(t)\cdot R_{ST}(t)\cdot R_X(t)\cdot R_Y(t).$$

The functioning of the detection and following device 20 will now be detailed with reference to FIG. 4, which illustrates the successive steps of a method that it can implement in accordance with the invention.

During a first initialization step 100 identified by the specific value at "2" of the instruction signal SC, a prior value $R_{ST}$ of the orientation of the movement sensor 22 with respect to the path T is determined in accordance with one of the three embodiments of the initialization phase described previously. In the second and third embodiments, this step can be carried out by executing the third computer program 44 by means of at least some of the measurements supplied by the movement sensor 22.

During a following step 102 of execution of the first computer program 40, the orientation at a time t, denoted $R_{RS}(t)$, of the movement sensor 22 with respect to the fixed reference 14R is estimated by means of the measurements supplied by the accelerometer 24, the magnetometer 26 and the gyrometer 28. As indicated above, this estimation may be averaged or filtered.

During a following step 104 of execution of the second computer program 42, the orientation at time t, denoted $R_{RT}(t)$, of the path T with respect to the fixed reference 14R is estimated by means of the current value of $R_{ST}$ recorded in the memory 34 and the orientation $R_{RS}(t)$ estimated at step 102. This can be done by means of the equation $R_{RT}(t)=R_{RS}(t)\cdot R_{ST}(t)$ or by means of the equation $R_{RT}(t)=R_{RS}(t)\cdot R_{ST}(t)\cdot R_X(t)\cdot R_Y(t)$.

During a step 106 of execution of the fourth computer program 46, the speed of movement at time t, denoted V(t), of the person 10 is estimated using the measurements supplied by the accelerometer 24. It should be noted that this step is executed independently of the steps 102 and 104, and in parallel to these steps.

Finally, during a step 108 of execution of the fifth computer program 48, this step necessarily following steps 104 and 106, the coordinates at time t of the path T expressed in the fixed reference 14R, denoted x(t) and y(t), are estimated by means of the orientation $R_{RT}(t)$ estimated at step 104 and the speed V(t) estimated at step 106. These coordinates x(t) and y(t) are recorded in the memory 36 so as to reconstruct the path T in the reference 14R.

In parallel to and independently of steps 102, 104, 106 and 108, an updating of the orientation value $R_{ST}$ of the movement sensor 22 with respect to the path T is automatically triggered on detection, during a step 110, of the change from "0" to "1" of the instruction signal SC supplied by the detector 30, this change from "0" to "1" indicating the start of a disorientation phase of the movement sensor 22 with respect to the path T.

During a following step of executing the third computer program 44, the orientation value $R_{ST}$ of the movement sensor 22 with respect to the path T is updated at the end of the disorientation phase, after detection of the change of the instruction signal SC from "1" to "0", in accordance with the computations presented above.

It is clear that a path detection and following device such as the one described above allows a simple and clever following of the orientation of a movement sensor carried by a physical system moving with respect to the path followed by this physical system, which then makes it possible to easily estimate the orientation of this path with respect to a fixed reference related to quantities that can be measured by the movement sensor.

It should moreover be noted that the invention is not limited to the embodiment described above.

Thus, in a variant, the digital tablet can be replaced by any medium, cellphone or the like, that can integrate a path detection and following device, or more generally a path orientation estimation device, such as the one described above able to be carried by the physical system the movement of which is being observed.

In a variant also, the representation of the various orientations defined above is done in matrix form, by means of reference change matrices. However, it could also have recourse to other formalisms such as quaternions, angles or other.

It will be clear more generally to a person skilled in the art that various modifications can be made to the embodiment described above, in the light of the teaching that has just been disclosed to him. In the following claims, the terms used must not be interpreted as limiting the claims to the embodiment disclosed in the present description but must be interpreted so as to include therein all equivalents that the claims aim to cover because of their wording and the provision of which is within the capability of a person skilled in the art applying his general knowledge to the implementation of the teaching that has just been disclosed to him.

The invention claimed is:

1. A method for estimating an orientation of a path followed by a carrier of a movement sensor, the method comprising:
    determining an orientation of the movement sensor with respect to the path followed by the carrier;
    estimating, by processing circuitry, an orientation of the movement sensor with respect to a fixed reference linked to a terrestrial reference frame by measurements supplied by the movement sensor;
    estimating, by the processing circuitry, an orientation of the path followed by the carrier with respect to the fixed reference by the determined orientation of the movement sensor with respect to the path and the estimated orientation of the movement sensor with respect to the fixed reference;
    detecting a start and end of a phase of disorientation of the movement sensor with respect to the path; and
    updating, by the processing circuitry, after the detected end of the disorientation phase, the determined orientation of the movement sensor with respect to the path based on the orientation of the path with respect to the fixed reference as estimated at the detected start of the disorientation phase and based on the orientation of the movement sensor with respect to the fixed reference as estimated after the detected end of the disorientation phase.

2. The method for estimating an orientation of a path according to claim 1, wherein a prior value of the orientation of the movement sensor with respect to the path is predetermined by recording a value entered by a user or known by default.

3. The method for estimating an orientation of a path according to claim 1, wherein:
    a plurality of prior values of the orientation of the movement sensor with respect to the path are predetermined by recording values entered by a user or known by default, each prior value being associated with a possible predetermined placement of the sensor; and one of the prior values is selected by measurements supplied by the sensor and characteristics of various possible predetermined placements of the sensor.

4. The method for estimating an orientation of a path according to claim 1, wherein a prior value of the orientation of the movement sensor with respect to the path is determined by estimation by a known prior value of the orientation of the path with respect to the fixed reference and the orientation of the movement sensor with respect to the fixed reference as estimated at an initial instant.

5. The method for estimating an orientation of a path according to claim 1, further comprising:

estimating a speed of the carrier by measurements supplied by the sensor; and reconstructing the path followed by the carrier by the estimated speed of the carrier and the estimated orientation of the path followed by the carrier with respect to the fixed reference.

6. The method for estimating an orientation of a path according to claim 5, wherein, the movement sensor comprising an accelerometer with three measurement axes, a magnetometer with three measurement axes, and a gyrometer with three measurement axes, the orientation of the movement sensor with respect to the fixed reference is estimated by the measurements supplied by the accelerometer, the magnetometer, and the gyrometer, and the speed of the carrier is estimated by the measurements supplied by the accelerometer.

7. The method for estimating an orientation of a path according to claim 1, wherein the orientation of the movement sensor with respect to the fixed reference as estimated after the detected end of the disorientation phase is an averaged or filtered value to reduce an effect of parasitic fluctuations of the movement of the carrier.

8. A non-transitory computer readable medium, comprising instructions for executing the orientation estimation method according to claim 1, when executed on a computer.

9. A device for estimating an orientation of a path followed by a carrier, comprising:

a movement sensor configured to be carried by the carrier;

storage for storing an orientation value of the movement sensor with respect to the path followed by the carrier;

a computer connected to the movement sensor and to the storage, programmed to:

estimate an orientation of the movement sensor with respect to a fixed reference related to a terrestrial reference frame by measurements supplied by the carrier, and estimate an orientation of the path followed by the carrier with respect to the fixed reference by the stored orientation value of the movement sensor with respect to the path and the estimated orientation of the movement sensor with respect to the fixed reference:

a detector for a start and end of a phase of disorientation of the movement sensor with respect to the path; and wherein the computer is further programmed to update, after the detected end of the disorientation phase, the stored orientation value of the movement sensor with respect to the path based on the orientation of the path with respect to the fixed reference as estimated at the detected start of the phase of disorientation and based on the orientation of the movement sensor with respect to the fixed reference as estimated after the detected end of the disorientation phase.

10. A device for estimating an orientation of a path according to claim 9, further comprising a digital tablet or a cellphone, the movement sensor, the storage, and the computer being integrated in the digital tablet or cellphone.

* * * * *